US011800558B2

(12) United States Patent
Zhang et al.

(10) Patent No.: US 11,800,558 B2
(45) Date of Patent: Oct. 24, 2023

(54) CONFIGURING LISTEN BEFORE TALK BANDWIDTH MONITORING

(71) Applicant: QUALCOMM Incorporated, San Diego, CA (US)

(72) Inventors: Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/905,109

(22) Filed: Jun. 18, 2020

(65) Prior Publication Data
US 2021/0400716 A1 Dec. 23, 2021

(51) Int. Cl.
*H04W 74/08* (2009.01)
*H04W 76/28* (2018.01)

(52) U.S. Cl.
CPC ....... *H04W 74/0808* (2013.01); *H04W 76/28* (2018.02)

(58) Field of Classification Search
CPC .......................... H04W 74/0808; H04W 76/28
See application file for complete search history.

(56) References Cited

U.S. PATENT DOCUMENTS

| 2010/0302983 | A1* | 12/2010 | McBeath | ............ | H04L 27/2647 370/311 |
| 2017/0237527 | A1* | 8/2017 | Lei | ........................ | H04L 1/1864 370/445 |
| 2018/0184410 | A1* | 6/2018 | John Wilson | ..... | H04W 72/0406 |
| 2019/0342777 | A1* | 11/2019 | Tiirola | .................. | H04L 5/0048 |
| 2020/0137823 | A1 | 4/2020 | Nam et al. | | |
| 2021/0058970 | A1* | 2/2021 | Kwak | ..................... | H04W 24/08 |
| 2021/0204214 | A1* | 7/2021 | Chang | ............... | H04W 72/0453 |

(Continued)

FOREIGN PATENT DOCUMENTS

| WO | WO-2020092054 A1 | 5/2020 |
| WO | WO-2021145967 | 7/2021 |

OTHER PUBLICATIONS

Interdigital, Inc: "DL Signals and Channels for gNB Initiated COT", 3GPP Draft, R1-1904851, 3GPP TSG RAN WG1 #96bis, DL Signals and Channels for gNB Initiated COT, 3rd Generation Partnership Project (3GPP), Mobile Competence Centre, 650, Route Des Lucioles, F-06921, Sophia-Antipolis, Cedex, France, vol. RAN WG1, No. Xi'an, China, Apr. 8, 2019-Apr. 12, 2019, Apr. 7, 2019 (Apr. 7, 2019), XP051699998, 6 Pages, Retrieved from the Internet: URL:http://www.3gpp.org/ftp/Meetings%5F3GPP%5FSYNC/RAN1/Docs/R1%2D1904851%2Ezip [retrieved on Apr. 7, 2019], Section 2, Section 4Page 2,line 23—p. 3. line 6, Figure 1.

(Continued)

*Primary Examiner* — Kevin M Cunningham
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of respective combinations of listen before talk (LBT) bandwidths for each of one or more downlink monitoring occasions. The UE may monitor for downlink communications in the respective combinations of LBT bandwidths for each of the one or more downlink monitoring occasions. Numerous other aspects are provided.

30 Claims, 9 Drawing Sheets

(56) References Cited

U.S. PATENT DOCUMENTS

2021/0282001 A1* 9/2021 Saber .................... H04W 24/08
2021/0410186 A1* 12/2021 Hajir ................. H04W 74/0816

OTHER PUBLICATIONS

International Search Report and Written Opinion—PCT/US2021/070596—ISA/EPO—dated Oct. 4, 2021.
Media Tek Inc., "Wideband Operation for NR-U", 3GPP Draft, 3GPP TSG RAN WG1 #99, R1-1912092, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 20198-Nov. 22, 2019, Nov. 9, 2019 (Nov. 9, 2019), XP051823185, 5 Pages, Retrieved from the Internet: URL: https://ftp.3gpp.org/tsg_ran/WG1_RL1/TSGR1_99/Docs/R1-1912092.zip. R1-1912092 MTK Wideband Operation for NR-U Final.docx. [Retrieved on Nov. 9, 2019], p. 2. lines 41-46.
Moderator (LG Electronics): "Summary of Email Discussion [100b-e-NR-unlic-NRU-WB-02] on CORESET and Search Space Configuration for NR-U Wideband Operation", 3GPP Draft, 3GPP TSG RAN WG1 #100bis, R1-2002755, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 27, 2020 (Apr. 27, 2020), XP051878581, 18 Pages, Retrieved from the Internet: URL: https://ftp.3gpp.org/tsg_ran/WG1_RL1/TSGR1_100b_e/Docs/R1-2002755.zip. R1-2002755.docx. [Retrieved on Apr. 27, 2020] p. 5. lines 17-50.

* cited by examiner

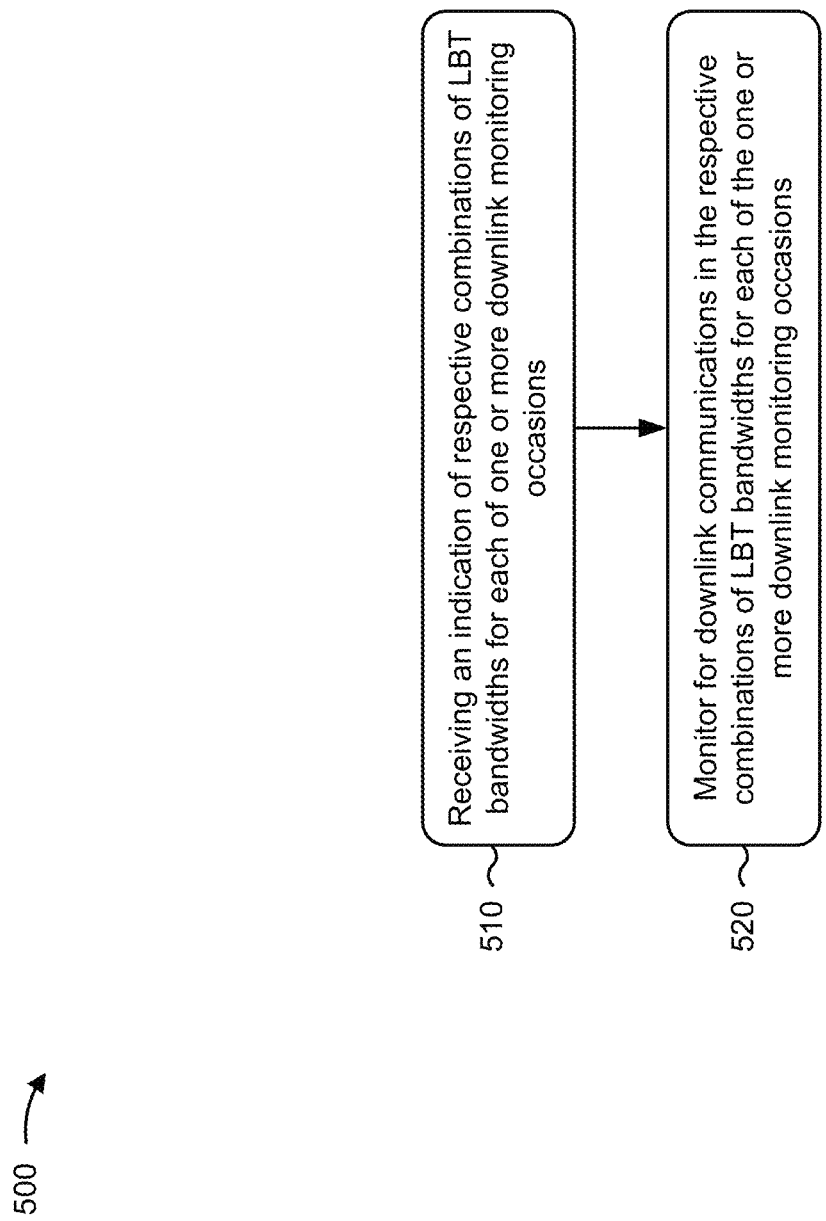

CONFIGURING LISTEN BEFORE TALK BANDWIDTH MONITORING

FIELD OF THE DISCLOSURE

Aspects of the present disclosure generally relate to wireless communication and to techniques and apparatuses for configuring listen before talk bandwidth monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include receiving an indication of respective combinations of listen before talk (LBT) bandwidths for each of one or more downlink monitoring occasions; and monitoring for downlink communications in the respective combinations of LBT bandwidths for each of the one or more downlink monitoring occasions.

In some aspects, a UE for wireless communication may include memory and one or more processors operatively coupled to the memory. The memory and the one or more processors may be configured to receive an indication of respective combinations of LBT bandwidths for each of one or more downlink monitoring occasions; and monitor for downlink communications in the respective combinations of LBT bandwidths for each of the one or more downlink monitoring occasions.

In some aspects, a non-transitory computer-readable medium may store one or more instructions for wireless communication. The one or more instructions, when executed by one or more processors of a UE, may cause the one or more processors to receive an indication of respective combinations of LBT bandwidths for each of one or more downlink monitoring occasions; and monitor for downlink communications in the respective combinations of LBT bandwidths for each of the one or more downlink monitoring occasions.

In some aspects, an apparatus for wireless communication may include means for receive an indication of respective combinations of LBT bandwidths for each of one or more downlink monitoring occasions; and means for monitor for downlink communications in the respective combinations of LBT bandwidths for each of the one or more downlink monitoring occasions.

In some aspects, a method of wireless communication, performed by a base station (BS), may include configuring an indication of respective combinations of LBT bandwidths for each of one or more downlink monitoring occasions; and transmitting the indication of the respective combinations of LBT bandwidths to a UE.

In some aspects, a BS for wireless communication may include memory and one or more processors operatively coupled to the memory. The memory and the one or more processors may be configured to configure an indication of respective combinations of LBT bandwidths for each of one or more downlink monitoring occasions; and transmit the indication of the respective combinations of LBT bandwidths to a UE.

In some aspects, a non-transitory computer-readable medium may store one or more instructions for wireless communication. The one or more instructions, when executed by one or more processors of a B S, may cause the one or more processors to configure an indication of respective combinations of LBT bandwidths for each of one or more downlink monitoring occasions; and transmit the indication of the respective combinations of LBT bandwidths to a UE.

In some aspects, an apparatus for wireless communication may include means for configuring an indication of respective combinations of LBT bandwidths for each of one or more downlink monitoring occasions; and means for transmitting the indication of the respective combinations of LBT bandwidths to a UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
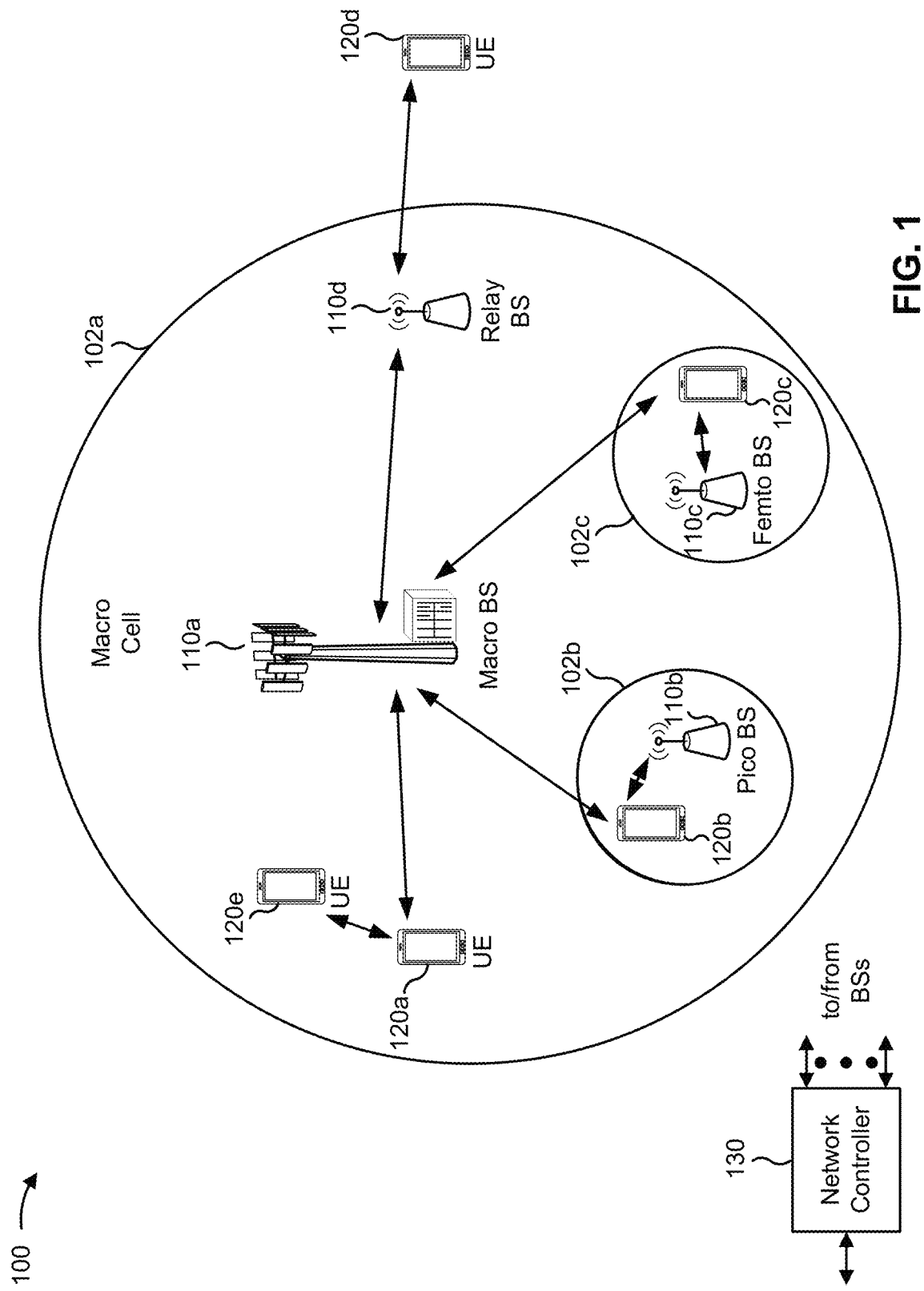
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
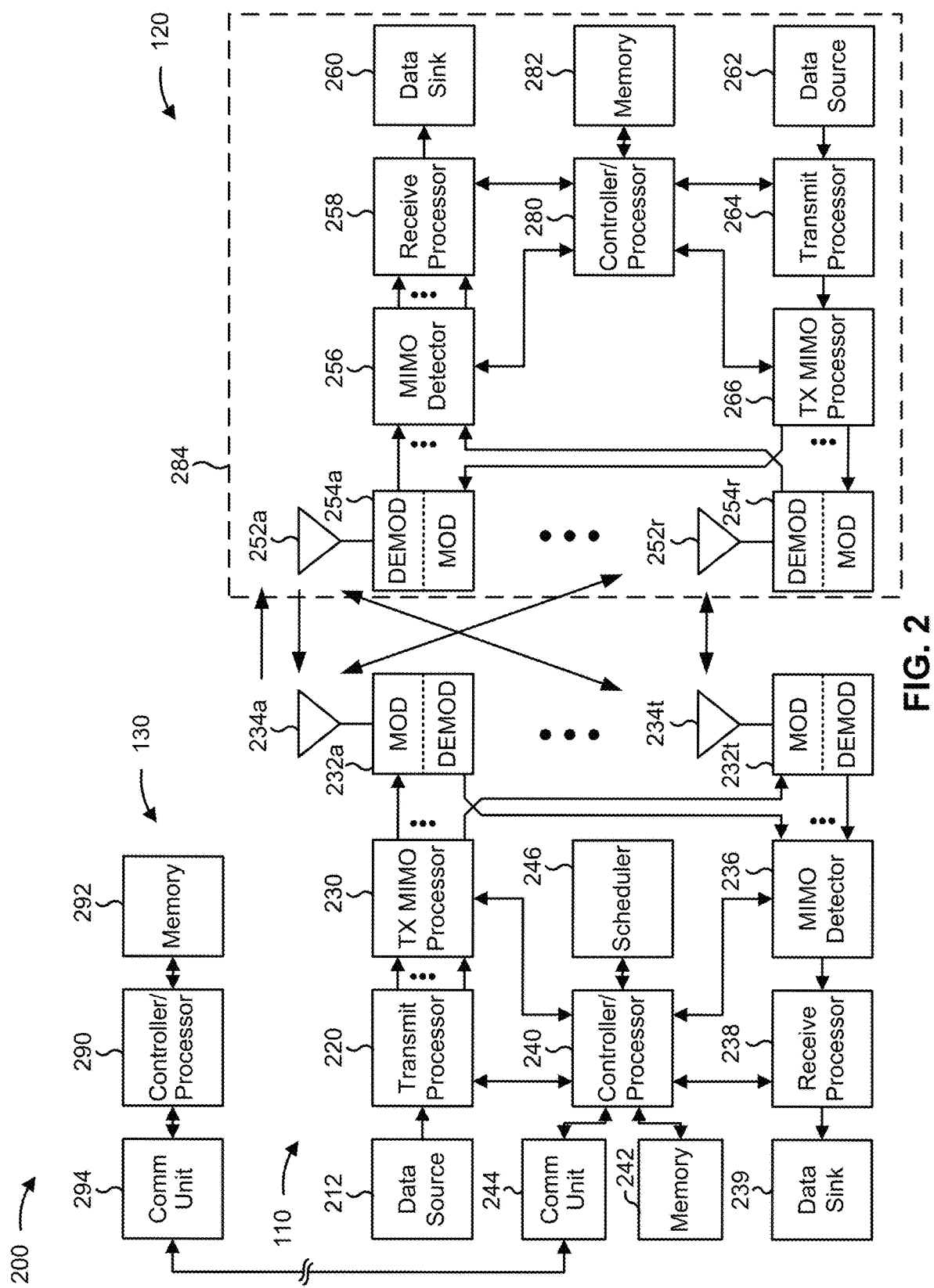
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring listen before talk (LBT) bandwidth monitoring, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for receiving an indication of respective combinations of LBT bandwidths for each of one or more downlink monitoring occasions, means for monitoring for downlink communications in the respective combinations of LBT bandwidths for each of the one or more downlink monitoring occasions, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring an indication of respective combinations of LBT bandwidths for each of one or more downlink monitoring occasions, means for transmitting the indication of the respective combinations of LBT bandwidths to a UE 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
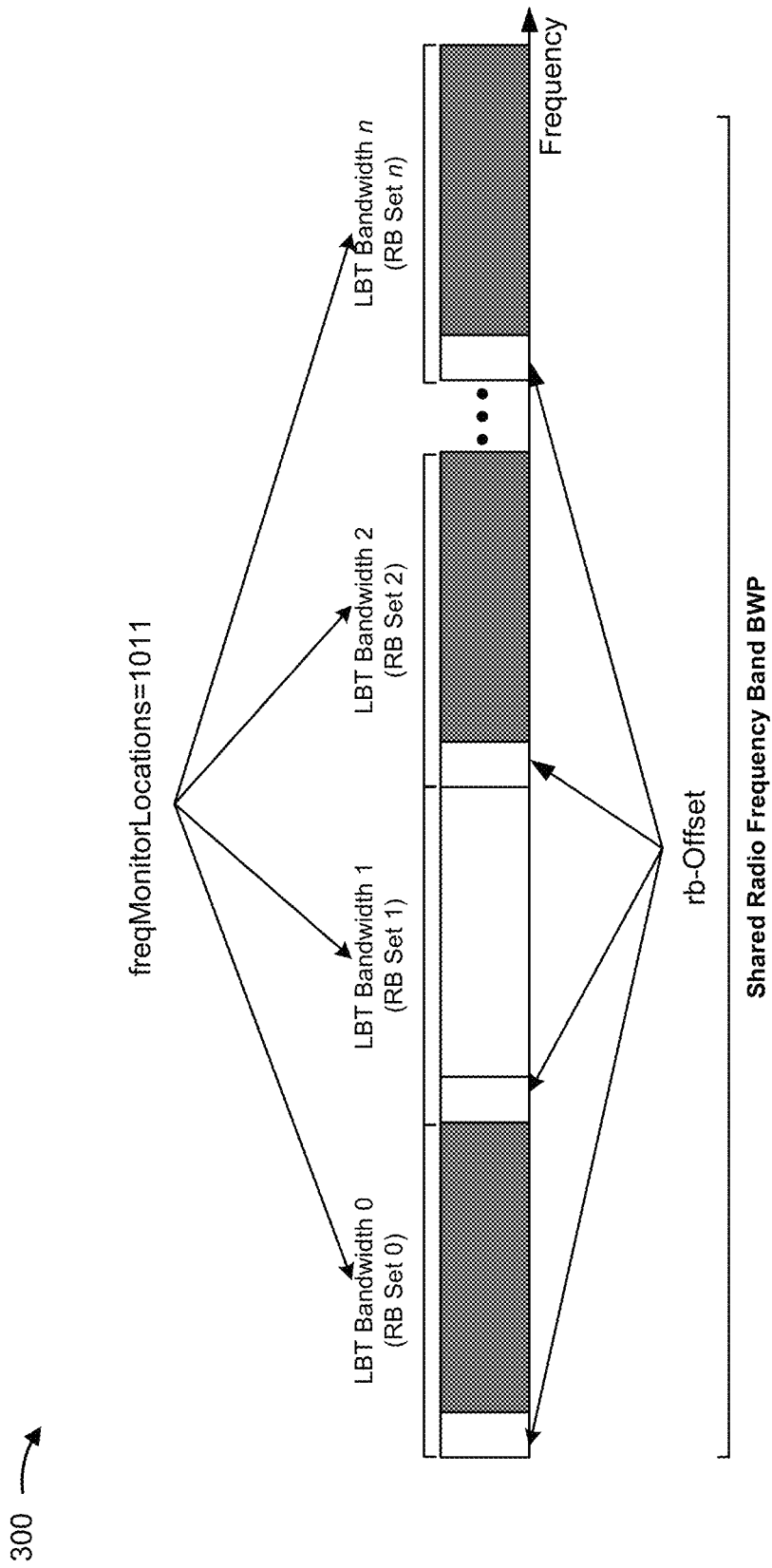
FIG. 3 is a diagram illustrating an example of partitioning a shared radio frequency spectrum into a plurality of listen before talk (LBT) bandwidths, in accordance with various aspects of the present disclosure.

FIG. 3 is a diagram illustrating an example 300 of partitioning a shared radio frequency band into a plurality of LBT bandwidths. A bandwidth part (BWP) for a BS operating on a shared (or unlicensed) frequency band (e.g., an NR-U frequency band or another type of frequency band) may be partitioned into a plurality of LBT bandwidths to permit efficient sharing of the shared radio frequency band among the BSs in the wireless network.

Each LBT bandwidth in the BWP (e.g., LBT bandwidth 0 through LBT bandwidth n) may be associated with a resource block (RB) set (e.g., RB set 0 through RB set n) in the frequency domain. Each RB set may include a plurality of usable RBs that start in the frequency domain after an RB offset. The RB offset may be indicated by an rb-Offset parameter, which may indicate a quantity of RBs. The frequency location of the plurality of useable RBs in an RB set may be determined based at least in part on the RB offset relative to a starting RB of the RB set.

A BS may activate all or a subset of the LBT bandwidths in the BWP for monitoring by one or more UEs. For example, the BS may transmit, to the one or more UEs, an indication of a freqMonitorLocations parameter or another type of parameter that indicates which of the LBT bandwidths are activate and to be monitored for downlink communications by the one or more UEs. The freqMonitorLocations parameter may include a bitmap or bit string in which each position in the bitmap or bit string is associated with a particular LBT bandwidth. For example, if the BWP includes 4 LBT bandwidths, the bitmap or bit string may include 4 bits, where each of the 4 bits is associated with one of the 4 LBT bandwidths. In these cases, the value of each bit may indicate whether the associated LBT bandwidth is active. As an example, and as illustrated in FIG. 3, freqMonitorLocations may be set to 1011, which indicates that the first, third, and fourth LBT bandwidths are active.

A BS in the wireless network may perform LBT procedures on each of the LBT bandwidths to identify and select an LBT bandwidth for transmission to a UE. In this way, BSs in the wireless network do not need to contend for the entire system bandwidth or BWP of the shared radio frequency band in order to transmit on the shared radio frequency band.

As indicated above, FIG. 3 is provided as an example. Other examples may differ from what is described with regard to FIG. 3. For example, a shared radio frequency band may be include a greater quantity or fewer RB sets and/or LBT bandwidths, a greater quantity of BWPs, and/or the like. As another example, a shared radio frequency band may include a different configurations of RB offset, active RB sets, RB set sizes and/or configurations, and/or other parameters.

In a shared radio frequency band deployment in a wireless network, search space sets may be mapped within each LBT bandwidth configured for the wireless network. In these cases, the search space set configurations for the LBT bandwidths in the wireless network may be configured in a manner that does not collectively consider the monitoring and decoding capabilities of the UEs that are communicatively connected with the wireless network. As a result, a UE that is configured to monitor a plurality of LBT bandwidths for downlink communications from a BS may be configured to monitor a quantity of search space candidates that increases the UE's processing, memory, and power consumption and/or exceeds the UE's monitoring and decoding capabilities.

Some aspects described herein provide techniques and apparatuses for configuring LBT bandwidth monitoring for a UE that communicates on shared radio frequency band. In some aspects, the UE may be configured to monitor time-varying combinations of LBT bandwidths for downlink communications from a BS. The BS may use various techniques, described herein, to indicate the time-varying combinations of LBT bandwidths to the UE. For example, the BS may semi-statically configure respective combinations of LBT bandwidths for each of one or more downlink monitoring occasions by transmitting an indication of the respective combinations to the UE. As another example, the BS may implicitly indicate the respective combinations by indicating, to the UE, the LBT bandwidths that the UE is to refrain from monitoring for each of the one or more downlink monitoring occasions. In these cases, the UE monitors the remaining (or non-indicated) LBT bandwidths configured for the shared radio frequency band for each of the one or more downlink monitoring occasions. As another example, the BS may indicate the respective combinations in a wakeup signal (WUS) for an associated discontinuous reception (DRX) on duration.

In this way, the BS may configure the UE to monitor for downlink communications across a plurality of LBT bandwidths in a shared radio frequency band in a manner that is supported by the monitoring and decoding capabilities of the UE. The BS may configure the combinations of LBT bandwidths to be time-varying to increase frequency diversity and to decrease the likelihood that a downlink communication is transmitted in an LBT bandwidth that is not monitored by the UE during a particular downlink monitoring occasion. Moreover, the BS may use the techniques described herein to increase control channel element (CCE) limits for the shared radio frequency band by reducing the quantity of LBT bandwidth the UE is to monitor per downlink monitoring occasion, which also permits the BS to increase the aggregation level and quantity of search space candidates within each LBT bandwidth.

FIGS. 4A-4D are diagrams illustrating one or more examples 400 of configuring LBT bandwidth monitoring, in accordance with various aspects of the present disclosure. As shown in FIGS. 4A-4D, example(s) 400 may include communication between a BS 110 (e.g., BS 110 illustrated and described above in connection with one or more of FIGS. 1 and 2, and/or the like) and a UE 120 (e.g., UE 120 illustrated and described above in connection with one or more of FIGS. 1 and 2, and/or the like). The BS 110 and the UE 120 may be included in a wireless network such as wireless network 100. The BS 110 and the UE 120 may communicate on a wireless access link, which may include an uplink and a downlink.

In some aspects, the BS 110 and the UE 120 communicate on a shared radio frequency band such as an NR-U frequency band or another type of shared radio frequency band. The BS 110 may configure a BWP for the UE 120. The BWP may be partitioned into a plurality of LBT bandwidths as described above in connection with FIG. 3 or in another configuration of LBT bandwidths.

Figure 4A:
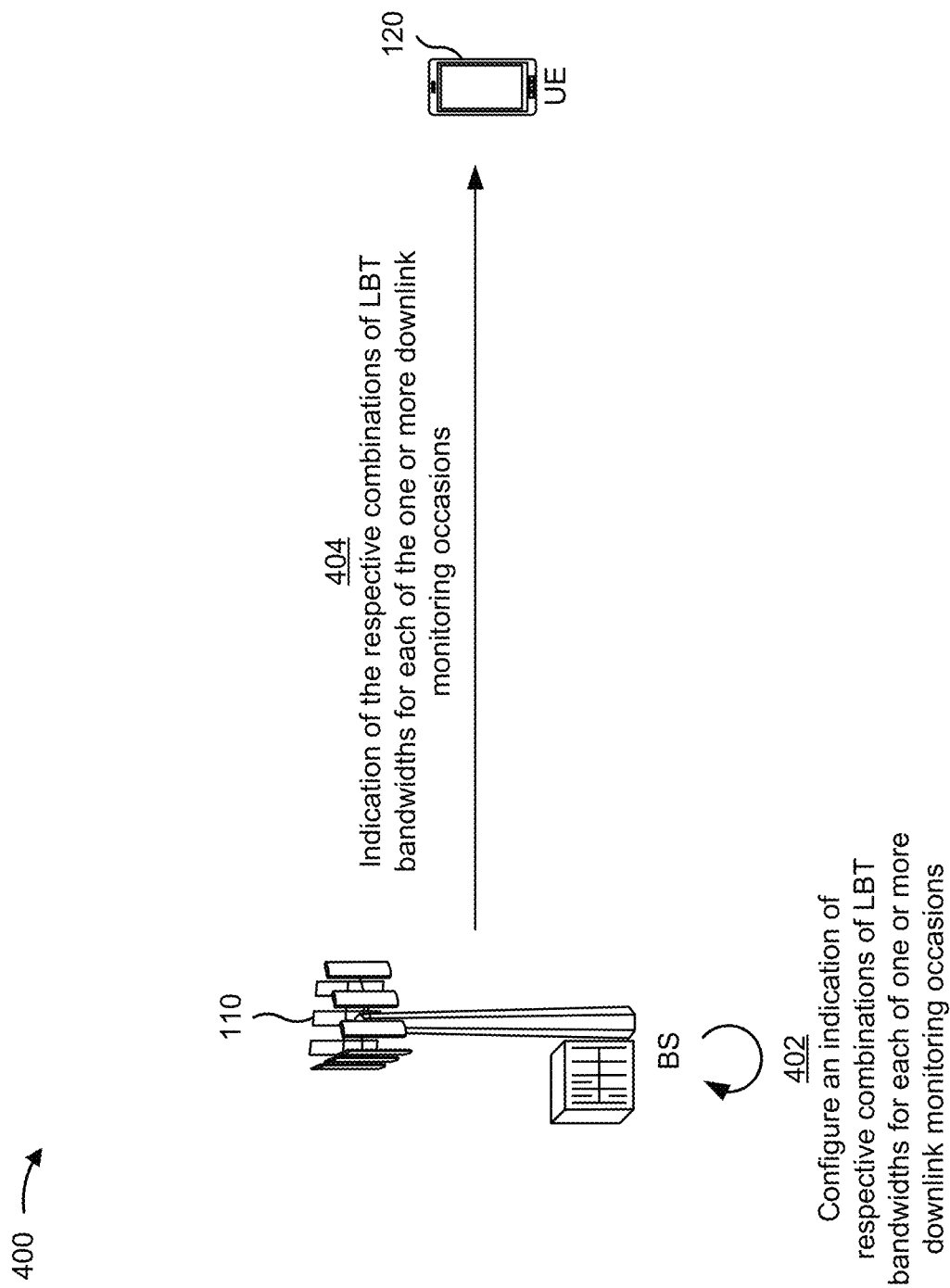
FIGS. 4A-4D are diagrams illustrating one or more examples of configuring LBT bandwidth monitoring, in accordance with various aspects of the present disclosure.

As shown in FIG. 4A, and by reference number 402, the BS 110 may configure an indication of respective combinations of LBT bandwidths for each of one or more downlink monitoring occasions. In some aspects, the BS 110 configures at least a subset of the one or more downlink monitoring occasions to have the same combination of LBT bandwidths. In some aspects, the BS 110 configures different combinations of LBT bandwidths for at least a subset of the one or more downlink monitoring occasions such that the combinations of LBT bandwidths that the UE 120 monitors varies with time. In this way, the UE 120 is configured to monitor a diverse frequency range across time, which reduces the likelihood that the UE 120 might miss a downlink communication from the BS 110 as a result of not monitoring an LBT bandwidth in which the downlink communication is transmitted.

A downlink monitoring occasion may include a time domain resource or resources (e.g., one or more slots, one or more symbols, and/or the like) during which the UE 120 is to monitor for downlink communications from the BS 110, such as physical downlink shared channel (PDSCH) communications, physical downlink control channel (PDCCH) communications, downlink reference signals (e.g., channel state information reference signal (CSI-RS), a demodulation reference signal (DMRS), and/or the like), and/or other types of downlink communications. The frequency domain resources (e.g., RBs, RB sets, resource elements, and/or the like) that the UE 120 monitors during a downlink monitoring occasion may be based at least in part on the combination of LBT bandwidths associated with the downlink monitoring occasion. In particular, the UE 120 may monitor, during a downlink monitoring occasion, the frequency domain resources included in each of the LBT bandwidths included in the combination of LBT bandwidths associated with the downlink monitoring occasion. Moreover, the UE 120 may refrain from monitoring the frequency domain resources included in the LBT bandwidths that are not included in the combination of the LBT bandwidths during the downlink monitoring occasion.

In some aspects, the BS 110 configures the indication of the respective combinations of LBT bandwidths for each of the one or more downlink monitoring occasions to be an explicit indication of the respective combinations of LBT bandwidths. For example, the BS 110 may configure a downlink communication to identify each LBT bandwidth that the UE 120 is to monitor during each of the one or more downlink monitoring occasions.

In some aspects, the BS 110 configures the indication of the respective combinations of LBT bandwidths for each of the one or more downlink monitoring occasions to be an implicit indication of the respective combinations of LBT bandwidths. The implicit indication may include an indication of the LBT bandwidths that the UE 120 is to refrain from monitoring. For example, the BS 110 may indicate one or more first LBT bandwidths that the UE 120 is to refrain from monitoring during a first downlink monitoring occasion, one or more second LBT bandwidths that the UE 120 is to refrain from monitoring during a second downlink monitoring occasion, one or more third LBT bandwidths that the UE 120 is to refrain from monitoring during a third downlink monitoring occasion, and so on.

In some aspects, the BS 110 configures the indication of the respective combinations of LBT bandwidths for each of the one or more downlink monitoring occasions to be an indication of one or more search space configurations. In some aspects, each search space configuration indicates a particular combination of LBT bandwidths and the downlink monitoring occasion(s) during which the UE 120 is to monitor the combination of LBT bandwidths for downlink communications from the BS 110. For example, a first search space configuration may indicate a first combination of LBT bandwidths (e.g., LBT bandwidths 0 and 1) for downlink monitoring occasions at time t0, time t3, and time t6, a second search space configuration may indicate a second combination of LBT bandwidths (e.g., LBT bandwidths 1 and 2) for downlink monitoring occasions at time t1, time t4, and time t7, a third search space configuration may indicate a third combination of LBT bandwidths (e.g., LBT bandwidths 0 and 2) for downlink monitoring occasions at time t2, time t5, and time t8, and so on.

In some cases, the quantity of search space configurations that the BS 110 is permitted to configure may be limited by a configuration, a specification, a wireless communication standard, and/or the like. The quantity of search space configurations that the BS 110 is permitted to configure may also be limited in that at least a subset of the search space configurations may be reserved for system uses, such as configuring search spaces for a master information block (MIB), one or more system information blocks (SIBs), other system information (OSI), slot format indication (SFI), paging, and/or the like. Accordingly, in some aspects, the quantity of search space configurations that the BS 110 is permitted to configure may be increased for the shared radio frequency band, relative to a licensed radio frequency band, to permit the BS 110 to configure a greater quantity of search space configurations for LBT bandwidth indication.

As further shown in FIG. 4A, and by reference number 404, the BS 110 may transmit the indication of the respective combinations of LBT bandwidths for each of the one or more downlink monitoring occasions to the UE 120. The BS 110 may transmit the indication of the respective combinations of LBT bandwidths for each of the one or more downlink monitoring occasions in semi-static signaling (e.g., in a radio resource control (RRC) communication), dynamic signaling (e.g., in a medium access control channel (MAC-CE) communication, a downlink control information (DCI) communication, and/or the like), in a WUS (e.g., if the UE 120 is configured to perform DRX operation), and/or the like.

In some aspects, the BS 110 may transmit the indication of the respective combinations of LBT bandwidths in a plurality of downlink communications. For example, the BS 110 may transmit an indication of a plurality of LBT bandwidth combinations via an RRC communication, and may transmit (e.g., in a WUS) another indication of the LBT bandwidth combination from the plurality of LBT bandwidth combinations that the UE 120 is to use for one or more downlink monitoring occasions during a DRX on duration for the UE 120.

Figure 4B:
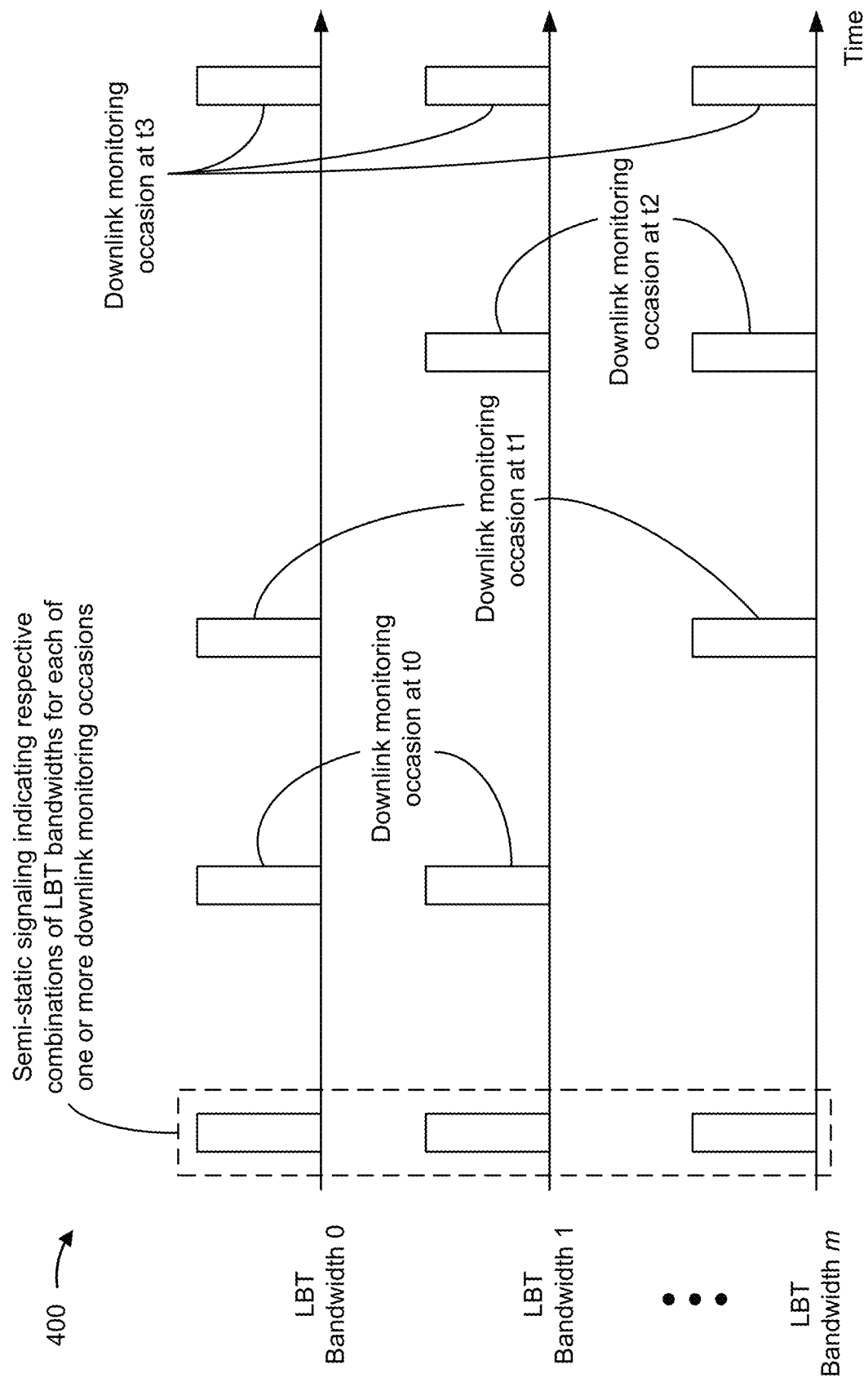

FIG. 4B illustrates an example configuration for monitoring one or more LBT bandwidths in a shared radio frequency band BWP (e.g., LBT bandwidth 0 through LBT bandwidth m) across a plurality of downlink monitoring occasions. As shown in FIG. 4B, the BS 110 may configure different combinations of LBT bandwidths for the plurality of downlink monitoring occasions such that the combinations of LBT bandwidths that the UE 120 monitors vary over time. For example, the BS 110 may configure LBT bandwidth 0 and LBT bandwidth 1 to be monitored during downlink monitoring occasion at time t0, may configure LBT bandwidth 0 and LBT bandwidth m to be monitored during downlink monitoring occasion at time t1, may configure LBT bandwidth 1 and LBT bandwidth m to be monitored during downlink monitoring occasion at time t2, and may configure LBT bandwidth 0, LBT bandwidth 1, and LBT bandwidth m to be monitored during downlink monitoring occasion at time t3. Other example combinations of time-varying LBT bandwidth monitoring may be configured using the techniques described herein.

As further shown in FIG. 4B the example LBT monitoring configuration for the plurality of downlink monitoring occasions may be indicated via semi-static signaling. The semi-static signaling may indicate the respective combinations of LBT bandwidths for the one or more downlink monitoring occasions. The BS 110 may transmit the indication of the respective combinations of LBT bandwidths for the one or more downlink monitoring occasions in an RRC communication or another type of semi-static signaling communication. The UE 120 may monitor for the RRC communication across one or more of the LBT bandwidths in the shared radio frequency band BWP.

As further shown in FIG. 4B, the semi-static signaling may indicate that all LBT bandwidths in the shared radio frequency band BWP (e.g., LBT bandwidth 0 through LBT bandwidth m) are to be monitored for one or more downlink monitoring occasions (e.g., the downlink monitoring occasion at time t3) and/or may indicate that a subset of the LBT bandwidths are to be monitored for one or more downlink monitoring occasions (e.g., the downlink monitoring occasions at time t0, t1, and t2).

If the BS 110 configures a subset of the LBT bandwidths to be monitored for a downlink monitoring occasion, the quantity of search space candidates and the quantity of CCEs that the UE 120 supports may be allocated across fewer LBT bandwidths than if all the LBT bandwidths were configured to be monitored during the downlink monitoring occasion. This permits the BS 110 to include a greater quantity of quantity of search space candidates and/or a quantity of CCEs within each of the LBT bandwidths to be monitored during the downlink monitoring occasion, which permits the BS 110 to increase the aggregation level within each of the LBT bandwidths.

Figure 4C:
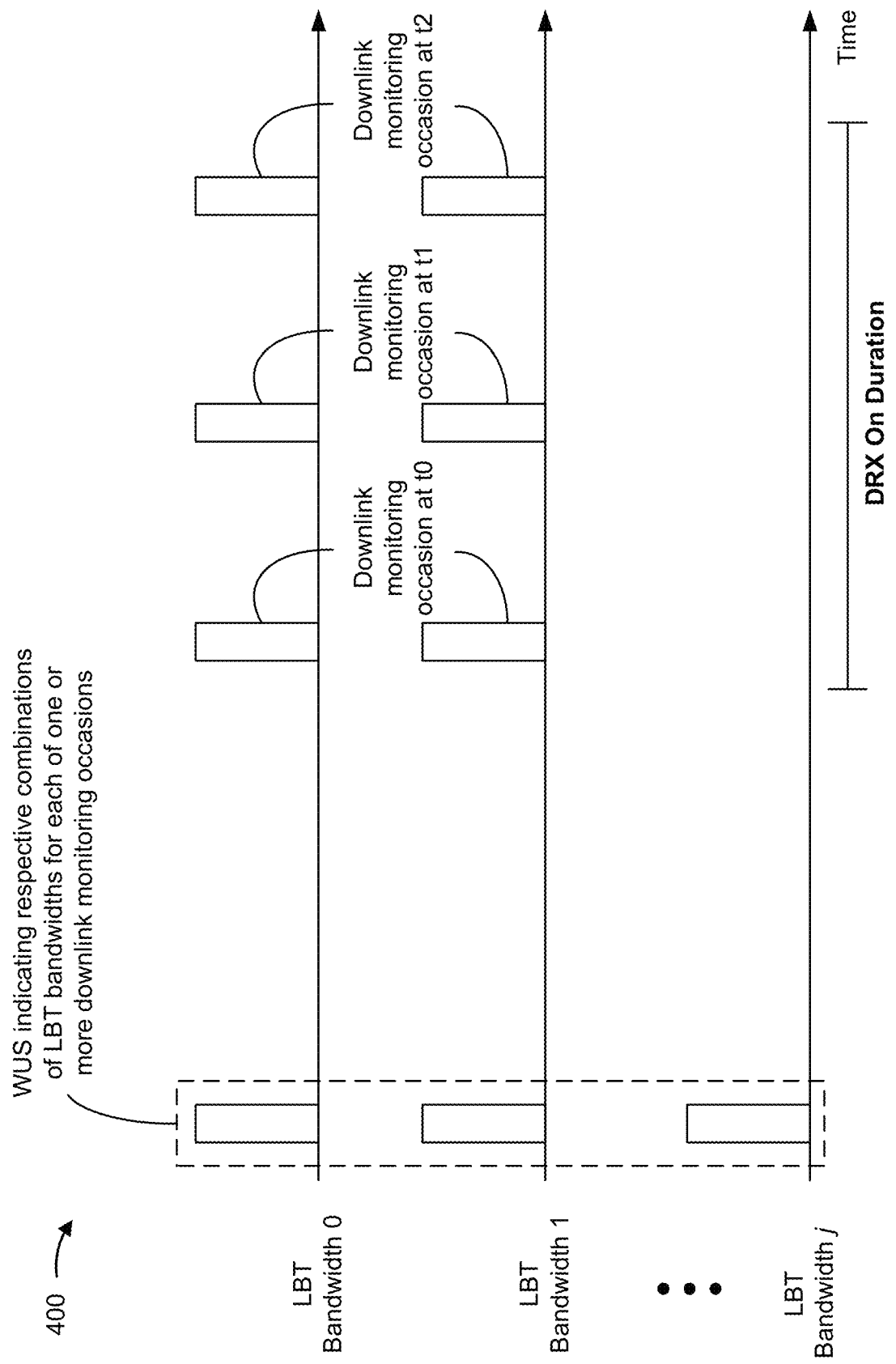

FIG. 4C illustrates another example configuration for monitoring one or more LBT bandwidths in a shared radio frequency band BWP (e.g., LBT bandwidth 0 through LBT bandwidth j). As shown in FIG. 4C, the BS 110 may configure the same combination of LBT bandwidths for the plurality of downlink monitoring occasions. For example, the BS 110 may configure LBT bandwidth 0 and LBT bandwidth 1 to be monitored during downlink monitoring occasions at time t0, t1, and t2. Other example combinations of LBT bandwidth monitoring (e.g., time-varying combinations, non-time-varying combinations, or a combination thereof) may be configured using the techniques described herein.

As further shown in FIG. 4C, the example LBT monitoring configuration for the plurality of downlink monitoring occasions may be indicated via a WUS. The UE 120 may monitor for the WUS across one or more of the LBT bandwidths for the shared radio frequency band during a WUS monitoring occasion. The WUS may include one or more bits that indicate the particular combination of LBT bandwidths for the downlink monitoring occasions. In some aspects, each possible value for the one or more bits may be associated with a respective LBT bandwidth combination of a plurality of LBT bandwidth combinations configured by the BS 110 via RRC signaling. In some aspects, each of the plurality of LBT bandwidth combinations may be associated with a serving cell of the BS 110. In some aspects, one or more of the plurality of LBT bandwidth combinations may be associated with the same serving cell, one or more of the plurality of LBT bandwidth combinations may be associated with different serving cells, and/or the like. The serving cell(s) of the BS 110 may include one or more primary cells (PCells), one or more secondary cells (SCells), and/or the like.

As further shown in FIG. 4C, the UE 120 may monitor the particular combination of LBT bandwidths during the downlink monitoring occasions, which may occur during a DRX on duration of the UE 120. The DRX on duration may be a DRX on duration associated with the WUS indicating the particular combination of LBT bandwidths. Moreover, the UE 120 may be permitted to transmit uplink communications to the BS 110 in the LBT bandwidths included in the particular LBT band configuration indicated by the WUS. In these cases, the UE 120 may transmit physical uplink shared channel (PUSCH) communications, physical uplink control channel (PUCCH) communications, uplink reference signals (e.g., a DMRS, a CSI-RS, a sounding reference signal (SRS), and/or the like), and/or other types of uplink communications to the BS 110 during the DRX on duration in the LBT bandwidths.

Figure 4D:
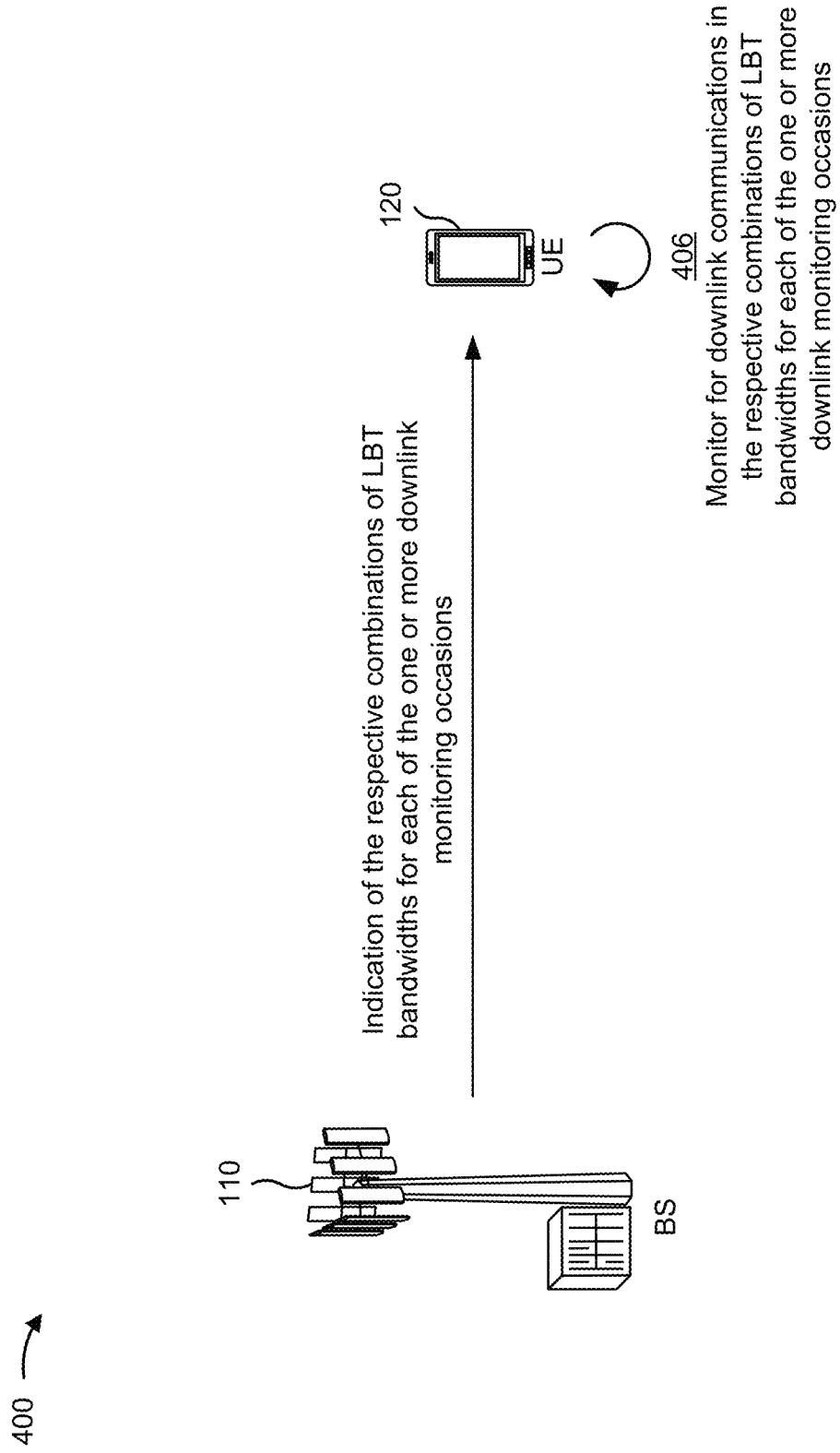

As shown in FIG. 4D, the UE 120 may receive the indication of the respective combinations of LBT bandwidths for each of the one or more downlink monitoring occasions. As shown by reference number 406, the UE 120 may monitor for downlink communications in the respective combinations of LBT bandwidths for each of the one or more downlink monitoring occasions. For example, if the indication includes an explicit indication of the respective combinations of LBT bandwidths, the UE 120 may monitor the explicitly indicated combinations of LBT bandwidths during the one or more downlink monitoring occasions.

As another example, if the indication includes an implicit indication of the respective combinations of LBT bandwidths (e.g., an indication of the LBT bandwidths that the UE 120 is to refrain from monitoring during the one or more downlink monitoring occasions), the UE 120 may monitor the LBT bandwidths, other than the indicated LBT bandwidths, during the one or more downlink monitoring occasions. In these cases, the UE 120 retrains from monitoring the indicated LBT bandwidths during the one or more downlink monitoring occasions.

As another example, if the indication includes an indication of one or more search space configurations, the UE 120 may identify the combination of LBT bandwidths indicated by each search space configuration and may monitor the combination of LBT bandwidths indicated by each search space configuration during the associated downlink monitoring occasion(s).

As another example, if the indication is included in a WUS, the UE 120 may monitor the respective combinations of LBT bandwidths for each of the one or more downlink monitoring occasions during a DRX on duration associated with the WUS.

In this way, the BS 110 may configure the UE 120 to monitor for downlink communications across a plurality of LBT bandwidths in a shared radio frequency band in a manner that is supported by the monitoring and decoding capabilities of the UE 120. The BS 110 may configure the combinations of LBT bandwidths to be time-varying to increase frequency diversity and to decrease the likelihood that a downlink communication is transmitted in an LBT bandwidth that is not monitored by the UE 120 during a particular downlink monitoring occasion. Moreover, the BS 110 may use the techniques described herein to increase CCE limits for the shared radio frequency band by reducing the quantity of LBT bandwidth the UE 120 is to monitor per downlink monitoring occasion, which also permits the BS 110 to increase the aggregation level and quantity of search space candidates within each LBT bandwidth.

As indicated above, FIGS. 4A-4D are provided as one or more examples. Other examples may differ from what is described with respect to FIGS. 4A-4D.

FIG. 5 is a diagram illustrating an example process 500 performed, for example, by a UE, in accordance with various aspects of the present disclosure. Example process 500 is an example where the UE (e.g., UE 120 illustrated and described above in connection with one or more of FIGS. 1-3, 4A-4D, and/or the like) performs operations associated with configuring LBT bandwidth monitoring.

As shown in FIG. 5, in some aspects, process 500 may include receiving an indication of respective combinations of LBT bandwidths for each of one or more downlink monitoring occasions (block 510). For example, the UE (e.g., using receive processor 258, transmit processor 264, controller/processor 280, memory 282, and/or the like) may receive an indication of respective combinations of LBT bandwidths for each of one or more downlink monitoring occasions, as described above.

As further shown in FIG. 5, in some aspects, process 500 may include monitoring for downlink communications in the respective combinations of LBT bandwidths for each of the one or more downlink monitoring occasions (block 520). For example, the UE (e.g., using receive processor 258, transmit processor 264, controller/processor 280, memory 282, and/or the like) may monitor for downlink communications in the respective combinations of LBT bandwidths for each of the one or more downlink monitoring occasions, as described above.

Process 500 may include additional aspects, such as any single aspect or any combination of aspects described below and/or in connection with one or more other processes described elsewhere herein.

In a first aspect, at least a subset of the respective combinations of LBT bandwidths include different combinations of LBT bandwidths. In a second aspect, alone or in combination with the first aspect, the indication of the respective combinations of LBT bandwidths explicitly identifies each LBT bandwidth included in each of the respective combinations of LBT bandwidths. In a third aspect, alone or in combination with one or more of the first and second aspects, the indication of the respective combinations of LBT bandwidths implicitly identifies each LBT bandwidth included in the respective combinations of LBT bandwidths by identifying LBT bandwidths, included in each of the respective combinations of LBT bandwidths, that the UE is to refrain from monitoring.

In a fourth aspect, alone or in combination with one or more of the first through third aspects, monitoring for downlink communications in the respective combinations of LBT bandwidths for each of the one or more downlink monitoring occasions comprises monitoring, in a downlink monitoring occasion of the one or more downlink monitoring occasions, LBT bandwidths configured for the UE other than an LBT bandwidth that the UE is to refrain from monitoring in the downlink monitoring occasion. In a fifth aspect, alone or in combination with one or more of the first through fourth aspects, the indication of the respective combinations of LBT bandwidths includes a plurality of search space configurations, and a search space configuration, of the plurality of search space configurations, identifies one or more LBT bandwidths for a particular set of downlink monitoring occasions.

In a sixth aspect, alone or in combination with one or more of the first through fifth aspects, a quantity of the plurality of search space configurations is based at least in part on a quantity of available search space configurations for a shared radio frequency band, and the quantity of available search space configurations for the shared radio frequency band is greater than a quantity of available search space configurations for a licensed radio frequency band. In a seventh aspect, alone or in combination with one or more of the first through sixth aspects, the indication of the respective combinations of LBT bandwidths is included in a WUS, and monitoring for downlink communications in the respective combinations of LBT bandwidths for each of the one or more downlink monitoring occasions comprises monitoring for downlink communications in the respective combinations of LBT bandwidths for each of the one or more downlink monitoring occasions during a DRX on duration associated with the WUS.

In an eighth aspect, alone or in combination with one or more of the first through seventh aspects, process 500 includes receiving an RRC communication that indicates a plurality of LBT bandwidth combinations, wherein the indication of the respective combinations of LBT bandwidths is including one or more bits, in the WUS, associated with one or more of the plurality of LBT bandwidth combinations. In a ninth aspect, alone or in combination with one or more of the first through eighth aspects, the one or more of the plurality of LBT bandwidth combinations includes a first LBT bandwidth combination associated with a serving cell of a BS and a second LBT bandwidth combination associated with the serving cell or another serving cell of the BS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
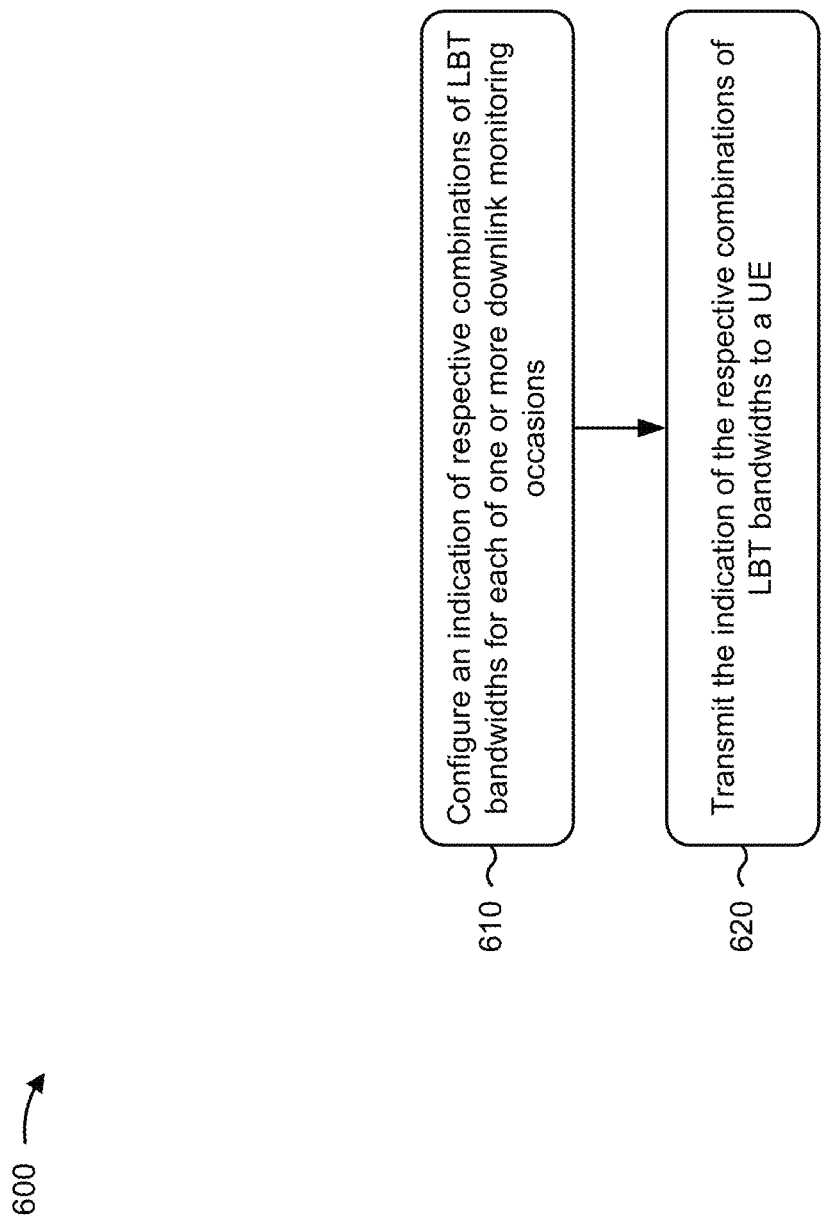
FIG. 6 is a diagram illustrating an example process performed, for example, by a BS, in accordance with various aspects of the present disclosure.

FIG. 6 is a diagram illustrating an example process 600 performed, for example, by a BS, in accordance with various aspects of the present disclosure. Example process 600 is an example where the BS (e.g., BS 110 illustrated and described above in connection with one or more of FIGS. 1-3, 4A-4D, and/or the like) performs operations associated with configuring LBT bandwidth monitoring.

As shown in FIG. 6, in some aspects, process 600 may include configuring an indication of respective combinations of LBT bandwidths for each of one or more downlink monitoring occasions (block 610). For example, the BS (e.g., using transmit processor 220, receive processor 238, controller/processor 240, memory 242, and/or the like) may configure an indication of respective combinations of LBT bandwidths for each of one or more downlink monitoring occasions, as described above.

As further shown in FIG. 6, in some aspects, process 600 may include transmitting the indication of the respective combinations of LBT bandwidths to a UE (block 620). For example, the BS (e.g., using transmit processor 220, receive processor 238, controller/processor 240, memory 242, and/or the like) may transmit the indication of the respective combinations of LBT bandwidths to a UE, as described above.

Process 600 may include additional aspects, such as any single aspect or any combination of aspects described below and/or in connection with one or more other processes described elsewhere herein.

In a first aspect, configuring the indication of the respective combinations of LBT bandwidths comprises: configuring at least a subset of the respective combinations of LBT bandwidths to include different combinations of LBT bandwidths. In a second aspect, alone or in combination with the first aspect, configuring the indication of the respective combinations of LBT bandwidths comprises configuring the indication of the respective combinations of LBT bandwidths to explicitly identify each LBT bandwidth included in each of the respective combinations of LBT bandwidths.

In a third aspect, alone or in combination with one or more of the first and second aspects, configuring the indication of the respective combinations of LBT bandwidths comprises configuring the indication of the respective combinations of LBT bandwidths to implicitly identify each LBT bandwidth included in the respective combinations of LBT bandwidths by identifying LBT bandwidths, included in each of the respective combinations of LBT bandwidths, that the UE is to refrain from monitoring. In a fourth aspect, alone or in combination with one or more of the first through third aspects, configuring the indication of the respective combinations of LBT bandwidths comprises configuring the indication of the respective combinations of LBT bandwidths to include a plurality of search space configurations, a search space configuration, of the plurality of search space configurations, identifies one or more LBT bandwidths for a particular downlink monitoring occasion periodicity.

In a fifth aspect, alone or in combination with one or more of the first through fourth aspects, a quantity of the plurality of search space configurations is based at least in part on a quantity of available search space configurations for a shared radio frequency band, and the quantity of available search space configurations for the shared radio frequency band is greater relative to a quantity of available search space configurations for a licensed radio frequency band. In a sixth aspect, alone or in combination with one or more of the first through fifth aspects, transmitting the indication of the respective combinations of LBT bandwidths comprises transmitting, to the UE, the indication of the respective combinations of LBT bandwidths in a WUS.

In a seventh aspect, alone or in combination with one or more of the first through sixth aspects, process 600 includes transmitting, to the UE, an RRC communication that indicates a plurality of LBT bandwidth combinations, wherein the indication of the respective combinations of LBT bandwidths is including one or more bits, in the WUS, associated with one or more of the plurality of LBT bandwidth combinations. In an eighth aspect, alone or in combination with one or more of the first through seventh aspects, the one or more of the plurality of LBT bandwidth combinations includes a first LBT bandwidth combination associated with a serving cell of the BS, and a second LBT bandwidth combination associated with the serving cell or another serving cell of the BS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, via a radio resource control (RRC) communication, a wakeup signal (WUS) comprising a plurality of bits providing an indication of combinations of listen before talk (LBT) bandwidths for a plurality of downlink monitoring occasions and a plurality of search space configurations,
   wherein the indication includes:
      a first combination of at least two LBT bandwidths, of the combinations of LBT bandwidths, for each of a first subset of at least two downlink monitoring occasions of the plurality of downlink monitoring occasions and for a first search space configuration of the plurality of search space configurations, and
      a second combination of at least two LBT bandwidths, of the combinations of LBT bandwidths, for each of a second subset of at least two downlink monitoring occasions of the plurality of downlink monitoring occasions and for a second search space configuration of the plurality of search space configurations,
         wherein at least one of the first subset of the at least two downlink monitoring occasions is different from at least one of the second subset of the at least two downlink monitoring occasions; and
   monitoring for downlink communications in the combinations of LBT bandwidths for the plurality of downlink monitoring occasions and the plurality of search space configurations.

2. The method of claim 1, wherein the indication of the combinations of LBT bandwidths explicitly identifies each LBT bandwidth included in each of the combinations of LBT bandwidths.

3. The method of claim 1, wherein the indication of the combinations of LBT bandwidths implicitly identifies each LBT bandwidth included in the combinations of LBT bandwidths by identifying one or more LBT bandwidths, of LBT bandwidths included in and the combinations of LBT bandwidths, that the UE is to refrain from monitoring.

4. The method of claim 3, wherein monitoring for the downlink communications in the combinations of LBT bandwidths for the plurality of downlink monitoring occasions comprises at least one of:
   monitoring, in at least one downlink monitoring occasion of the first subset of the at least two downlink monitoring occasions, the first combination of the at least two LBT bandwidths configured for the UE other than the one or more LBT bandwidths that the UE is to refrain from monitoring in the first subset of at least two downlink monitoring occasions; or
   monitoring, in at least one downlink monitoring occasion of the second subset of the at least two downlink monitoring occasions, the second combination of the at least two LBT bandwidths configured for the UE other than the one or more LBT bandwidths that the UE is to refrain from monitoring in the second subset of the at least two downlink monitoring occasions.

5. The method of claim 1, wherein a quantity of the plurality of search space configurations is based at least in part on a quantity of available search space configurations for a shared radio frequency band; and
   wherein the quantity of available search space configurations for the shared radio frequency band is greater than a quantity of available search space configurations for a licensed radio frequency band.

6. The method of claim 1, wherein monitoring for the downlink communications in the combinations of LBT bandwidths for the plurality of downlink monitoring occasions and the plurality of search space configurations comprises:
   monitoring for the downlink communications in the combinations of LBT bandwidths for the plurality of downlink monitoring occasions and the plurality of search space configurations during a discontinuous reception (DRX) on duration associated with the WUS.

7. The method of claim 1, wherein the first combination of the at least two LBT bandwidths is associated with a serving cell of a network entity, and wherein the second combination of the at least two LBT bandwidths is associated with the serving cell or another serving cell of the network entity.

8. The method of claim 1, wherein monitoring for downlink communications in the combinations of LBT bandwidths for the plurality of downlink monitoring occasions and the plurality of search space configurations comprises:
   monitoring, for the downlink communications, frequency domain resources included in each of the combinations of LBT bandwidths associated with the plurality of downlink monitoring occasions.

9. The method of claim 1, wherein the plurality of search space configurations includes a third search space configuration indicating a third combination of at least two LBT bandwidths, of the combinations of LBT bandwidths, for a third subset of the plurality of downlink monitoring occasions.

10. The method of claim 1, wherein the plurality of bits include a first bit, indicating the first combination of the at least two LBT bandwidths, and a second bit, indicating a second combination of the at least two LBT bandwidths.

11. The method of claim 1, wherein the first combination of the at least two LBT bandwidths and the second combination of the at least two LBT bandwidths are associated with a same serving cell.

12. A method of wireless communication performed by a network entity, comprising:
   configuring an indication of combinations of listen before talk (LBT) bandwidths for a plurality of downlink monitoring occasions and a plurality of search space configurations,
   wherein the indication includes:
      a first combination of at least two LBT bandwidths, of the combinations of LBT bandwidths, for each of a first subset of at least two downlink monitoring occasions of the plurality of downlink monitoring occasions and for a first search space configuration of the plurality of search space configurations, and
      a second combination of at least two LBT bandwidths, of the combinations of LBT bandwidths, for each of a second subset of at least two downlink monitoring occasions of the plurality of downlink monitoring occasions and for a second search space configuration of the plurality of search space configurations,
   wherein at least one of the first subset of the at least two downlink monitoring occasions is different from at least one of the second subset of the at least two downlink monitoring occasions; and
   transmitting, via a radio resource control (RRC) communication, a wakeup signal (WUS) comprising a plurality of bits that provide the indication of the combinations of LBT bandwidths to a user equipment (UE).

13. The method of claim 12, wherein configuring the indication of the combinations of LBT bandwidths comprises:
   configuring the indication of the combinations of LBT bandwidths to explicitly identify each LBT bandwidth included in each of the combinations of LBT bandwidths.

14. The method of claim 12, wherein configuring the indication of the combinations of LBT bandwidths comprises:
   configuring the indication of the combinations of LBT bandwidths to implicitly identify each LBT bandwidth included in the combinations of LBT bandwidths by identifying one or more LBT bandwidths, of LBT bandwidths included in the combinations of LBT bandwidths, that the UE is to refrain from monitoring.

15. The method of claim 12, wherein a quantity of the plurality of search space configurations is based at least in part on a quantity of available search space configurations for a shared radio frequency band; and
   wherein the quantity of available search space configurations for the shared radio frequency band is greater relative to a quantity of available search space configurations for a licensed radio frequency band.

16. The method of claim 12, wherein the first combination of the at least two LBT bandwidths is associated with a serving cell of the network entity, and wherein the second combination of the at least two LBT bandwidths is associated with the serving cell or another serving cell of the network entity.

17. The method of claim 12, wherein the plurality of search space configurations includes a third search space configuration indicating a third combination of at least two LBT bandwidths, of the combinations of LBT bandwidths, for a third subset of the plurality of downlink monitoring occasions.

18. The method of claim 12, wherein the plurality of bits include a first bit, indicating the first combination of the at least two LBT bandwidths, and a second bit, indicating a second combination of the at least two LBT bandwidths.

19. The method of claim 12, wherein the first combination of the at least two LBT bandwidths and the second combination of the at least two LBT bandwidths are associated with a same serving cell.

20. A user equipment (UE) for wireless communication, comprising:
   a memory; and
   one or more processors coupled to the memory, the one or more processors configured to:
      receive, via a radio resource control (RRC) communication, a wakeup signal (WUS) comprising a plurality of bits providing an indication of combinations of listen before talk (LBT) bandwidths for a plurality of downlink monitoring occasions and a plurality of search space configurations,
      wherein the indication includes:
         a first combination of at least two LBT bandwidths, of the combinations of LBT bandwidths, for each of a first subset of at least two downlink monitoring occasions of the plurality of downlink monitoring occasions and for a first search space configuration of the plurality of search space configurations, and
         a second combination of at least two LBT bandwidths, of the combinations of LBT bandwidths, for each of a second subset of at least two downlink monitoring occasions of the plurality of downlink monitoring occasions and for a second search space configuration of the plurality of search space configurations,
      wherein at least one of the first subset of the at least two downlink monitoring occasions is different from at least one of the second subset of the at least two downlink monitoring occasions; and
      monitor for downlink communications in the combinations of LBT bandwidths for the plurality of downlink monitoring occasions and the plurality of search space configurations.

21. The UE of claim 20, wherein the indication of the combinations of LBT bandwidths explicitly identifies each LBT bandwidth included in each of the combinations of LBT bandwidths.

22. The UE of claim 20, wherein the one or more processors, to monitor for the downlink communications in the combinations of LBT bandwidths for the plurality of downlink monitoring occasions and the plurality of search space configurations, are configured to:
monitor for the downlink communications in the combinations of LBT bandwidths for the plurality of downlink monitoring occasions and the plurality of search space configurations monitor for the downlink communications in the combinations of LBT bandwidths for the plurality of downlink monitoring occasions and the plurality of search space configurations during a discontinuous reception (DRX) on duration associated with the WUS.

23. The UE of claim 20, wherein the first combination of the at least two LBT bandwidths is associated with a serving cell of a network entity, and wherein the second combination of the at least two LBT bandwidths is associated with the serving cell or another serving cell of the network entity.

24. The UE of claim 20, wherein the one or more processors, to monitor for the downlink communications in the combinations of LBT bandwidths for the plurality of downlink monitoring occasions and the plurality of search space configurations, are configured to:
monitor, for the downlink communications, frequency domain resources included in each of the combinations of LBT bandwidths associated with the plurality of downlink monitoring occasions.

25. The UE of claim 20, wherein the plurality of bits include a first bit, indicating the first combination of the at least two LBT bandwidths, and a second bit, indicating a second combination of the at least two LBT bandwidths.

26. The UE of claim 20, wherein the first combination of the at least two LBT bandwidths and the second combination of the at least two LBT bandwidths are associated with a same serving cell.

27. A network entity for wireless communication, comprising:
a memory; and
one or more processors coupled to the memory, the one or more processors configured to:
configure an indication of combinations of listen before talk (LBT) bandwidths for a plurality of downlink monitoring occasions and a plurality of search space configurations,
wherein the indication includes:
a first combination of at least two LBT bandwidths, of the combinations of LBT bandwidths, for each of a first subset of at least two downlink monitoring occasions of the plurality of downlink monitoring occasions and for a first search space configuration of the plurality of search space configurations, and
a second search space configuration indicating a second combination of at least two LBT bandwidths, of the combinations of LBT bandwidths, for each of a second subset of at least two downlink monitoring occasions of the plurality of downlink monitoring occasions,
wherein at least one of the first subset of the at least two downlink monitoring occasions is different from at least one of the second subset of the at least two downlink monitoring occasions and for a second search space configuration of the plurality of search space configurations; and
transmit, via a radio resource control (RRC) communication, a wakeup signal (WUS) comprising a plurality of bits that provide the indication of the combinations of LBT bandwidths to a user equipment (UE).

28. The network entity of claim 27, wherein the first combination of the at least two LBT bandwidths is associated with a serving cell of the network entity, and wherein the second combination of the at least two LBT bandwidths is associated with the serving cell or another serving cell of the network entity.

29. The network entity of claim 27, wherein the plurality of bits include a first bit, indicating the first combination of the at least two LBT bandwidths, and a second bit, indicating a second combination of the at least two LBT bandwidths.

30. The network entity of claim 27, wherein the first combination of the at least two LBT bandwidths and the second combination of the at least two LBT bandwidths are associated with a same serving cell.

* * * * *